3,121,672
MANUFACTURE OF NEW GRAFT COPOLYMERS
Robert Roy Smith, East Bergholt, Dennis Charles Macmillan Mann, Mistley, and Enid Bevis, Colchester, England, assignors to B. X. Plastics Limited, near Manningtree, Essex, England, a British company
No Drawing. Filed Sept. 2, 1958, Ser. No. 758,618
Claims priority, application Great Britain Sept. 4, 1957
3 Claims. (Cl. 204—154)

This invention relates to the manufacture of macromolecular materials, and more especially to graft copolymers.

When a polymer chain is reactivated and side chains consisting of another or the same monomer are caused to grow on the existing polymer, a so-called graft copolymer is obtained. The term "graft copolymer" is therefore used to designate a macromolecule in which the second polymeric chain exists as branches on the primary or "trunk" chain. A graft copolymer may be represented, for example, by the formula:

(1) 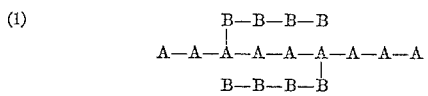

When, however, the polymer chain poly-A is broken and chains of another monomer (B) enter the chain and, so to speak, bridge the gap, so that in the resulting compound there is an alternation of long sequences of one unit with long sequences of another unit, a so-called "block copolymer" is obtained. A copolymer of this kind may be represented, for example, by the formula:

(2) 

These graft and block compounds are distinct from ordinary copolymers in which the components are usually distributed at random in a straight or branched chain, and which may be represented, for example, by the formula:

(3) 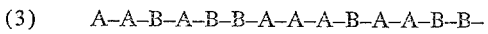

and they generally possess appreciably different properties from the ordinary copolymers.

Ordinary copolymers of the type illustrated by the Formula 3 above generally have properties which are intermediate between those of the two homopolymers poly-A and poly-B, whereas block copolymers, and especially graft copolymers, may possess both some of the properties of poly-A and some of poly-B. Thus, if the two constituents of a graft copolymer have hydrophilic and hydrophobic properties respectively, the material may act as a detergent and an emulsifier with unusual solubility properties.

Graft copolymers have been obtained by the "chain transfer" method. When a monomer (B) containing a dissolved polymer (poly-A) is polymerised, chain transfer of the growing radicals of B with poly-A leads to the formation of poly-B branches on the poly-A chain. This method, however, generally gives rise to appreciable amounts of the homopolymers poly-A and poly-B in addition to the desired graft product, and the separation of these homopolymers may be troublesome.

Graft copolymers may be made by subjecting a polymer to ionising radiation while in contact with a monomeric vinyl or divinyl compound that is different from the monomer from which the polymer is derived.

The present invention provides new graft copolymers derived from polyvinyl chloride or a copolymer of vinyl chloride, and from ethyl acrylate and a process for their manufacture, wherein polyvinyl chloride or a copolymer of vinyl chloride and another polymerisable substance, is subjected to high energy ionising radiation while in contact with ethyl acrylate monomer, the polyvinyl chloride or vinyl chloride copolymer constituting more than 5 percent by weight of the mixture. In the products of this process a certain proportion of the copolymer will be present as a block copolymer in admixture with the graft product. The extent of cross-linking of the structures can be varied according to the conditions employed.

The products of the present invention have the advantage that they exhibit rather similar physical properties to those of a conventionally plasticised sheet of the polyvinyl chloride or vinyl chloride copolymer (containing for example, 30 percent of plasticiser) but without having the drawbacks associated with leaching and migration of plasticiser.

As the vinyl chloride copolymer which may be used as the trunk polymer there is advantageously used a copolymer of vinyl chloride and vinylidene chloride, or of vinyl chloride and vinyl acetate, preferably one containing not more than 25 percent by weight of vinylidene chloride or vinyl acetate. The polyvinyl chloride or copolymer is preferably soaked in the ethyl acrylate for a few hours to swell it, before subjection to irradiation.

The irradiation is advantageously carried out on the material in the substantial absence of oxygen as, for example, in vacuo. As ionising radiation there is to be understood radiation which is capable of producing ions in air under normal atmospheric conditions, which ions can be detected by their charge. As such radiation there may be mentioned $\beta$-rays, accelerated electrons, thermal neutrons, accelerated deuterons and protons, X-rays or, more especially, $\gamma$-rays. There may be used as sources of ionising radiation atomic piles, electron or particle accelerators, radioactive isotopes and X-ray equipment.

It is thought that upon irradiation ions are first formed on the polyvinyl chloride or vinyl chloride copolymer and that these then combine to produce free radicals or "active centres," which initiate polymerisation of the ethyl acrylate and provide points of attachment for the resulting ethyl acrylate chains so as to form a graft product. As the ionising radiation may also form free radicals in the ethyl acrylate monomer and cause polymerisation, some homopolymer of ethyl acrylate will be formed in addition to the graft copolymer.

The ionising radiation is advantageously $\gamma$-rays, for example, from a $Co^{60}$ source. The dose rate may be up to 50 m. rep./minute or more, and in the case of $\gamma$-rays preferably between 10,000 and 1,000,000 rep./hour. The properties of the final product and the degree of grafting may be varied to some extent by adjusting the dose-rate of the radiation and also by varying the temperature and duration of the treatment.

In a particularly advantageous form of the invention the polyvinyl chloride or vinyl chloride copolymer is in the form of a shaped body, especially a foil. It may, however, be in the form of a powder or dissolved in a solvent.

The following examples illustrate the invention:

*Example 1*

A calendered sheet of unplasticised Geon 202 (a copolymer of vinyl chloride and about 3% by weight vinylidene chloride) containing 0.5 percent by weight of stearic acid was soaked in ethyl acrylate monomer for 10 hours at room temperature when its weight increased by 122 percent by swelling. The sheet was then sealed in a glass vessel in vacuo and subjected to $\gamma$-rays from a $Co^{60}$ source for 1 hour at a dose rate of 50,000 rep./hour, as a result of which the ethyl acrylate in the swollen sheet polymerised substantially completely. The product was extracted for 5 hours with boiling methanol, whereupon only 1 percent loss in weight was observed. On pressing the graft film at 5,000 lbs. per square inch at 195° C. for 1 minute, a clear coherent, flexible film was produced.

The softening behaviour of this film was compared with (a) the original Geon 202 sheet and (b) a conventional flexible plasticised polyvinyl chloride sheet containing 30 parts by weight of plasticiser (dioctyl phthalate) per 100 parts by weight of polyvinyl chloride. At temperatures below 70° C. the irradiated graft product was a little less soft than (b) and above 70° C. it was considerably softer than (b).

The graft product differs substantially from (b) in that a negligible fraction can be extracted by solvents or will migrate.

The graft film obtained at any stage in the above process will swell considerably, but not dissolve, in ethylene dichloride. On drying the swollen polymer in vacuo a very soft, opaque, rubbery material results.

*Example 2*

A calendered sheet of VYNS (a copolymer of vinyl chloride and vinyl acetate containing about 12 percent vinyl acetate) was soaked in ethyl acrylate monomer for 10 hours at room temperature when its weight increased by approximately 355 percent by swelling. The sheet was then sealed in a glass vessel in vacuo and subjected to γ-rays from a $Co^{60}$ source for 1 hour at a dose rate of 50,000 rep./hour, as a result of which the ethyl acrylate in the swollen sheet polymerised substantially completely.

The product was a very soft, somewhat opaque film from which a negligible proportion can be extracted by common solvents.

We claim:

1. A process for the manufacture of a flexible film composed of a graft copolymer, which comprises soaking a vinyl chloride copolymer selected from the group consisting of a copolymer of vinyl chloride with about 3% by weight of vinylidene chloride and a copolymer of vinyl chloride with about 12% of vinyl acetate, in ethyl acrylate monomer until the vinyl chloride copolymer is in a swollen state, the vinyl chloride copolymer constituting from 5 to 50% of the total weight of the copolymer and absorbed ethyl acrylate, then subjecting the swollen copolymer in the substantial absence of oxygen to high energy, ionising radiation to a total dose of from 10,000 to 100,000 rep., and subjecting the graft copolymer so obtained to heat and pressure without mechanical working to form a film.

2. A process for the manufacture of a flexible film composed of a graft copolymer, which comprises soaking a vinyl chloride copolymer consisting of a copolymer of vinyl chloride with about 3% by weight calculated on the monomer mixture of vinylidene chloride, in ethyl acrylate monomer until the vinyl chloride copolymer is in a swollen state, the vinyl chloride copolymer constituting from 5 to 50% of the total weight of the copolymer and absorbed ethyl acrylate, then subjecting the swollen copolymer in the substantial absence of oxygen to high energy ionising radiation to a total dose of from 10,000 to 100,000 rep., and subjecting the graft copolymer so obtained to heat and pressure without mechanical working to form a film.

3. A process for the manufacture of a flexible film composed of a graft copolymer, which comprises soaking a vinyl chloride copolymer consisting of a copolymer of vinyl chloride with about 12% calculated on the monomer mixture of vinyl acetate, in ethyl acrylate monomer until the vinyl chloride copolymer is in a swollen state, the vinyl chloride copolymer constituting from 5 to 50% of the total weight of the copolymer and absorbed ethyl acrylate, then subjecting the swollen copolymer in the substantial absence of oxygen to high energy ionising radiation to a total dose of from 10,000 to 100,000 rep., and subjecting the graft copolymer so obtained to heat and pressure without mechanical working to form a film.

References Cited in the file of this patent

UNITED STATES PATENTS

| | | |
|---|---|---|
| 2,841,569 | Rugg et al. | July 1, 1958 |
| 2,849,419 | Hayes et al. | Aug. 26, 1958 |
| 2,863,812 | Graham | Dec. 9, 1958 |
| 2,878,174 | Rainer et al. | Mar. 17, 1959 |
| 2,921,006 | Schmitz et al. | Jan. 12, 1960 |
| 2,926,126 | Graham et al. | Feb. 23, 1960 |
| 2,983,657 | Gabilly et al. | May 9, 1961 |
| 2,999,056 | Tanner | Sept. 5, 1961 |

FOREIGN PATENTS

| | | |
|---|---|---|
| 540,383 | Great Britain | Oct. 15, 1941 |
| 761,051 | Great Britain | Nov. 7, 1956 |
| 1,130,099 | France | Sept. 17, 1956 |
| 546,816 | Belgium | Oct. 6, 1956 |

OTHER REFERENCES

Ballantine et al.: Fission Products Utilization, IX, Studies on Radiation Including Graft Copolymerization, AEC Report BNL-414 (T-81), October 1956, 14 pages.